Sept. 13, 1966   B. K. WOOLFENDEN   3,272,520
SHAFT SEAL ASSEMBLY
Original Filed June 6, 1962

INVENTOR.
BRIAN K. WOOLFENDEN
BY Shanley & O'Neil
ATTORNEYS

United States Patent Office 3,272,520
Patented Sept. 13, 1966

3,272,520
SHAFT SEAL ASSEMBLY
Brian K. Woolfenden, Lexington, Mass., assignor to Air Products and Chemicals, Inc., a corporation of Delaware
Continuation of application Ser. No. 200,515, June 6, 1962. This application Mar. 18, 1965, Ser. No. 444,915
13 Claims. (Cl. 277—165)

This application is a continuation of applicant's co-pending application Serial No. 200,515, filed June 6, 1962, and now abandoned, for "Shaft Seal Assembly."

The present invention relates to improvements in sealing assemblies, and more particularly to novel assemblies for sealing a rotatable or reciprocating shaft.

It is an object of the present invention to provide a shaft seal assembly of the split-ring type having automatic take-up to compensate for wear on the split rings.

Another object of the present invention is the provision of a shaft seal assembly that is automatically self-centering.

Still another object of the present invention is the provision of a shaft seal assembly that is of the floating type in the sense that the parts may move relative to each other but at the same time does not leak.

Still another object of the present invention is the provision of a shaft seal assembly that is readily interchangeable with other types of shaft seals.

A still further object of the present invention is to provide a shaft seal assembly that will be relatively simple and inexpensive to manufacture, easy to install, maintain, repair and replace, and rugged and durable in use.

Figure 1:
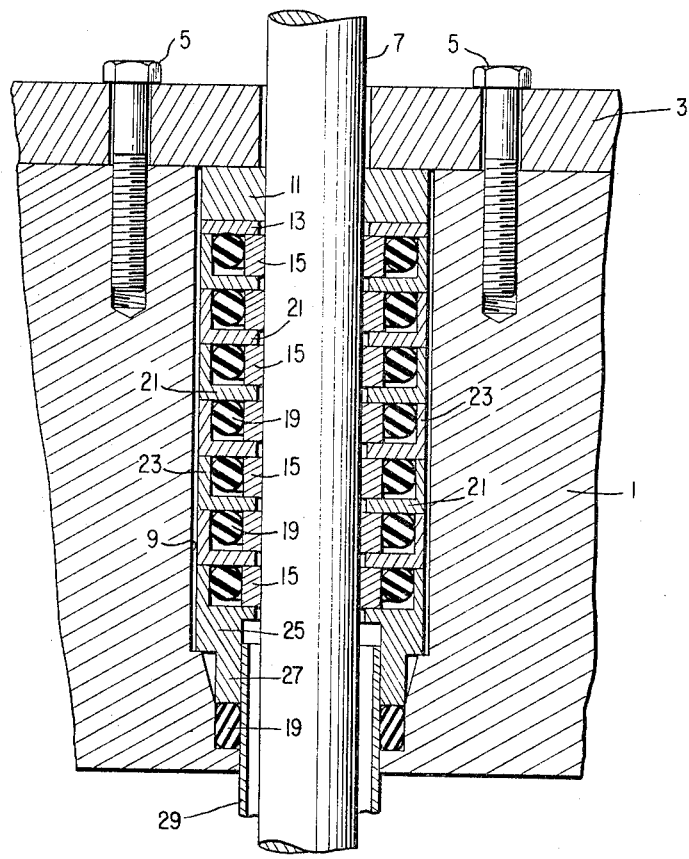
Figure 2:
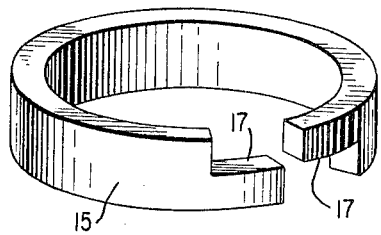

Other objects and advantages of the present invention will become apparent from a consideration of the following description, taken in connection with the accompanying drawing, in which:

FIGURE 1 is a cross-sectional view of a shaft seal assembly according to the present invention; and FIGURE 2 is an enlarged perspective view of a split ring for use with a shaft seal assembly of the present invention.

Referring now to the drawing in greater detail, there is shown a housing 1 provided with a cover plate 3 held thereon by bolts 5. Housing 1 and cover plate 3 have aligned openings therethrough, through which passes a shaft 7. Shaft 7 is movably mounted relative to housing 1 and cover plate 3 for reciprocatory or rotative movement along or about its axis, or both.

Housing 1 is provided with an enlarged annular recess 9 about shaft 7 adjacent cover plate 3, and it is in this recess that the seal proper of the present invention is disposed. An annular bushing 11 is disposed at one end of the seal against cover plate 3, and end ring 13 bears against bushing 11. A plurality of split sealing rings 15 coaxial with shaft 7 and with each other are spaced apart along shaft 7 and together form the seal along the surface of the shaft. Split sealing rings 15 are seen in FIGURE 2 to have free ends 17 that overlap when the sealing rings are assembled to the shaft. It will of course be appreciated that the gap between the ends of the ring is exaggerated in FIGURE 2 for purposes of illustration. In actual practice, ends 17 overlie each other both in the assembled and in the disassembled positions of rings 15. It is preferred that ends 17 have as long a region of overlap as is practical, thereby to impede fluid passage past the ring between ends 17.

An O-ring 19 backs up each split ring 15 and urges its associated ring 15 into closer circumferential engagement with shaft 7. O-rings 19 alternate with retainer rings 21 to form a stack extending substantially the full length of the seal. Each ring 21 is a flat annulus disposed in a plane perpendicular to the axis of shaft 7. Each ring 21 has means spacing it from the next adjacent ring 21, comprising in the illustrated embodiment an annular flange 23 disposed about and integral with the outer peripheral edge of ring 21 and in the form of a cylinder coaxial with shaft 7, thereby to provide a continuous circular flange 23 on each retainer ring 21.

At least the radially outer portions of split rings 15 are disposed between retainer rings 21 in alternate relationship in a stack; although it must be understood that split rings 15 are not necessarily in contact with both adjacent retainer rings 21. Indeed, it is preferred that the distance between the radially innermost portions of the adjacent rings 21 be slightly greater than the axial extent of a split ring 15, so that rings 15 are not pinched between rings 21. In this way, rings 21 serve as guides for rings 15 without being in unitary assembly with rings 15, so that rings 15 and 21 may move relative to each other.

Indeed, rings 15, 19 and 21 may all move relative to each other; and therein lies one of the principal advantages of the present invention, for the elements of the seal assembly of the present invention are thereby rendered able to shift in position relative to each other and to adapt themselves to variations in the position of shaft 7 relative to housing 1 and cover plate 3. Preferably, rings 21 are of an outside diameter slightly less than the inside diameter of recess 9. Moreover, flanges 23 have an axial extent which is preferably slightly greater than the axial extent of split rings 15, so that when flanges 23 are in contact with their next adjacent rings 21, split rings 15 may still move fairly freely relative to rings 21.

O-rings 19 can be compressed in sealing contact between their associated retainer rings 21, in which case the axial extent of flanges 23 would be less than the undeformed thickness of O-rings 19; but it is preferred that O-rings be disposed as shown in FIGURE 1, in sealing contact with the next adjacent retainer ring 21, that is, the retainer ring 21 next adjacent the ring 21 within the flange 23 of which the O-ring in question is disposed. In this latter case, the axial extent of an O-ring 19 is less than the axial extent of the associated split ring 15 or the axial extent of the adjacent flange 23, whichever is greater. In this position, O-rings 19 seal against the adjacent flange 23 and split ring 15 but are spaced from the annular flange portion of their associated retainer ring 21, that is, the flange portion of ring 21 which is below the O-ring in question in FIGURE 1.

O-rings 19 are automatically maintained in the illustrated position by the fluid pressure on the high pressure side, which is the lower side of FIGURE 1. As pressure is applied to each of the annular cavities in which an O-ring is disposed, from a source of pressure that is radially inward of that cavity, the pressure can be relieved by the passage of fluid between flanges 23 and the adjacent rings 21 that they loosely contact. As a result, the O-rings also tend to move in the direction of the low pressure outlet for the fluid and thus promptly seal against the underside of the next upper ring 21 as seen in FIGURE 1. The fluid pressure against which the seal is provided thus maintains the seal in fluid-sealing relationship with the associated flange 23 and the next adjacent ring 21.

In assembled relationship, O-rings 19 seal peripherally about split rings 15 and also seal against at least the next adjacent retainer ring 21. What corresponds to the lowermost retainer ring in FIGURE 1 is in the form of a ring 25 having an axially extending flange 27 that compresses an O-ring 19 against an annular shoulder of housing 1 and that slides about sleeve 29. Sleeve 29 encompasses but is spaced outwardly from shaft 7 and provides a conduit for confining escaping gases such as the working fluid of a compressor or other device in connection with which the present seal assembly is used. Sleeve 29 also radially outwardly confines the lowermost O-ring 19 shown in FIGURE 1. Accordingly, fluid attempting to pass along shaft 7 reaches the joint between ring 25 and sleeve 29 but cannot pass beyond the associated O-ring 19. The fluid reaches the joint between ring 25 and the adjacent split ring 15, and the joints between rings 21 and 15, but cannot pass beyond the associated O-rings 19. The fluid can move between a split ring 15 and shaft 7, or between the ends 17 of a split ring 15, only with the greatest difficulty.

In the illustrated embodiment, O-rings 19 are shown as sealing against flanges 23, so that each O-ring 19 seals between the concentric side walls of the annular cavity in which it is disposed. It will be understood, however, that while it is preferred that O-rings 19 bear againts flanges 23, it is not necessary. The pressure between O-rings 19 and flanges 23 augments the constrictive action of O-rings 19 on split rings 15 and also serves to assure that the axes of rings 15 and 21 do not diverge undesirably great distances from each other. However, flanges 23 could if desired be spaced radially outward from O-rings 19. In this case, O-rings 19 should seal against both of the adjacent rings 21.

Similarly, it is preferred but not necessary that rings 19 be O-rings. They could have other cross-sectional configurations. The use of O-rings is preferred because they are readily commercially available, and also because the material of the O-rings is readily displaceable into the corners of the rectangular cross section of the annular chambers in which the O-rings are disposed. It is to be understood, however, that the O-rings do not in any even provide rolling seals as in the case of many applications of O-rings. Instead, they perform the dual function of constricting split rings 15 and sealing against rings 15 and 21.

From a consideration of the foregoing disclosure, it will be obvious that all of the initially recited objects of the present invention have been achieved.

Although the present invention has been described and illustrated in connection with a preferred embodiment, it is to be understood that modifications and variations may be resorted to without departing from the spirit of the invention as those skilled in this art will readily understand.

Such modifications and variations are considered to be within the purview and scope of the present invention as defined by the appended claims.

What is claimed is:

1. Apparatus for sealing a shaft which extends through an opening in a housing comprising
    a seal assembly encompassing the shaft and extending axially of the shaft and being disposed at least in part within a cavity defined by an internal substantially cylindrical wall of the housing surrounding the shaft,
    the seal assembly including a split sealing ring surrounding the shaft and located in a plane substantially perpendicular to the longitudinal axis of the shaft,
    a pair of separate retainer rings surrounding the shaft and located in spaced planes substantially perpendicular to the longitudinal axis of the shaft,
    the split ring being disposed between the pair of separate retainer rings in radially overlapping relation therewith and each retainer ring extending radially outwardly of the shaft beyond the outer surface of the split ring and terminating in an outer substantially cylindrical surface,
    each retainer ring having an internal diameter greater than the external diameter of the shaft and the diameter of the outer cylindrical surface of each retainer ring being less than the diameter of the internal cylindrical wall of the housing,
    means for supporting the pair of retainer rings for relative movement,
    an elastic deformable ring disposed between the pair of retainer rings and located radially outwardly of the split ring in contact with the outer surface of the split ring,
    and spacer means disposed between the retainer rings radially outwardly of the elastic deformable ring,
    the elastic deformable ring urging the split ring into contact with the shaft and providing a fluid seal with the split ring and a fluid seal with at least one of the retainer rings.

2. Apparatus as defined in claim 1 in which the elastic deformable ring is an O-ring.

3. Apparatus as defined in claim 1 in which the spacer means has an axial extent greater than the axial extent of the split ring.

4. Apparatus as claimed in claim 1 in which the spacer means is sealed to a retainer ring and the elastic deformable ring forms a fluid seal with the spacer means.

5. Apparatus as defined in claim 1 in which the spacer means is an annular flange integral with one of the retainer rings and extending axially toward and contacting the other retainer ring and in which the elastic deformable ring forms a fluid seal with the annular flange and with the other retainer ring.

6. Apparatus for sealing a shaft which extends through an opening in a housing comprising
    a seal assembly encompassing the shaft and extending axially of the shaft and being disposed at least in part within a cavity defined by an internal substantially cylindrical wall of the housing surrounding the shaft,
    the seal assembly including a plurality of split sealing rings surrounding the shaft and located in spaced planes substantially perpendicular to the longitudinal axis of the shaft,
    a plurality of separate retainer rings surrounding the shaft and located in spaced planes substantially perpendicular to the longitudinal axis of the shaft,
    each split ring being disposed between a pair of adjacent retainer rings in radially overlapping relation therewith and each pair of adjacent retainer rings extending radially outwardly of the shaft beyond the outer surface of the split ring interposed therebetween and terminating in an outer substantially cylindrical surface,
    each retainer ring having an internal diameter greater than the diameter of the shaft and the diameter of the outer cylindrical surface of each retainer ring being less than the diameter of the internal cylindrical wall of the housing,
    means supporting each retainer ring for movement relative to the other retainer rings,
    an elastic deformable ring located radially outwardly of each split ring,
    each elastic deformable ring being in contact with the outer surface of its associated split ring and being disposed between the pair of adjacent retainer rings located on opposite sides of its associated split ring,
    and spacer means located between pairs of adjacent retainer rings,
    each spacer means being positioned radially outwardly of the elastic deformable ring disposed between the pair of adjacent retainer rings between which the spacer means is located,
    each elastic deformable ring urging its associated split ring into contact with the shaft and providing a fluid seal with its associated split ring and a fluid seal with at least one retainer ring of the pair of retainer rings between which the split ring is interposed.

7. Apparatus as defined in claim 6 in which the elastic deformable rings are O-rings.

8. Apparatus for sealing a shaft as defined in claim 6 in which the spacer means interposed between each pair of adjacent retainer rings has an axial extent greater than the axial extent of the split ring located between corresponding pairs of adjacent retainer rings.

9. Apparatus as defined in claim 6 in which the spacer means interposed between each pair of adjacent retainer rings is sealed to one retainer ring of the pair and the elastic deformable ring forms a fluid seal with the spacer means.

10. Apparatus as defined in claim 6 in which the spacer means interposed between each pair of adjacent retainer rings is an annular flange integral with one of the retainer rings of the pair which extends axially toward and contacts the other retainer ring of the pair and in which the elastic deformable ring forms a fluid seal with the annular flange and with the other retainer ring of the pair.

11. Apparatus for sealing a shaft extending through an opening in a housing communicating with a zone of low pressure on one side of the housing and zone of relatively high pressure on the other side of the housing, comprising a seal assembly located about the shaft and extending axially of the shaft and disposed at least in part within a cavity defined by an internal substantially cylindrical wall of the housing disposed about the shaft, the seal assembly including a plurality of split sealing rings surrounding the shaft and located in spaced planes substantially perpendicular to the longitudinal axis of the shaft, a plurality of separate retainer rings surrounding the shaft and located in spaced planes substantially perpendicular to the longitudinal axis of the shaft, each split ring being disposed between a pair of adjacent retainer rings in radially overlapping relation therewith and each pair of adjacent retainer rings extending radially outwardly of the shaft beyond the outer surface of the split ring interposed therebetween and terminating in an outer substantially cylindrical surface, each retainer ring having an internal diameter greater than the diameter of the shaft and the diameter of the outer cylindrical surface of each retainer ring being less than the diameter of the internal cylindrical wall of the housing, means supporting each retainer ring for movement relative to the other retainer rings, an elastic deformable ring located radially outwardly of each split ring, each elastic deformable ring being in contact with the outer surface of its associated split ring and being disposed between the pair of adjacent retainer rings located on opposite sides of its associated split ring, and spacer means located between pairs of adjacent retainer rings, each spacer means being joined to one retainer ring of the pair of adjacent retainer rings between which the spacer means is located and being positioned radially outwardly of the elastic deformable ring disposed between such pair of adjacent retainer rings, the elastic deformable rings urging associated split rings into contact with the shaft and providing a fluid seal with associated split rings, each elastic deformable ring being provided with an axial dimension less than the axial extent between adjacent pairs of retainer rings between which it is disposed and each elastic deformable ring being deformable in response to a pressure differential between the zones to form a fluid seal with the spacer means positioned radially outwardly therefrom and to form a fluid seal with the other retainer ring.

12. Apparatus as defined in claim 11 in which the elastic deformable rings are O-rings.

13. Apparatus as defined in claim 11 in which the spacer means interposed between pairs of adjacent retainer rings has an axial extent greater than the axial extent of the split ring located between corresponding pairs of adjacent retainer rings.

References Cited by the Examiner

UNITED STATES PATENTS

| 1,807,555 | 1/1929 | Ruggles | 277—163 |
| 2,625,413 | 1/1953 | Christensen | 286—26 |

FOREIGN PATENTS 505,024  5/1939  Great Britain.

LAVERNE D. GEIGER, *Primary Examiner.*

J. MEDNICK, *Assistant Examiner.*